I. S. MERRELL.
PROCESS OF TREATING JUICE AND PRODUCT.
APPLICATION FILED SEPT. 11, 1919.
1,398,081.
Patented Nov. 22, 1921.
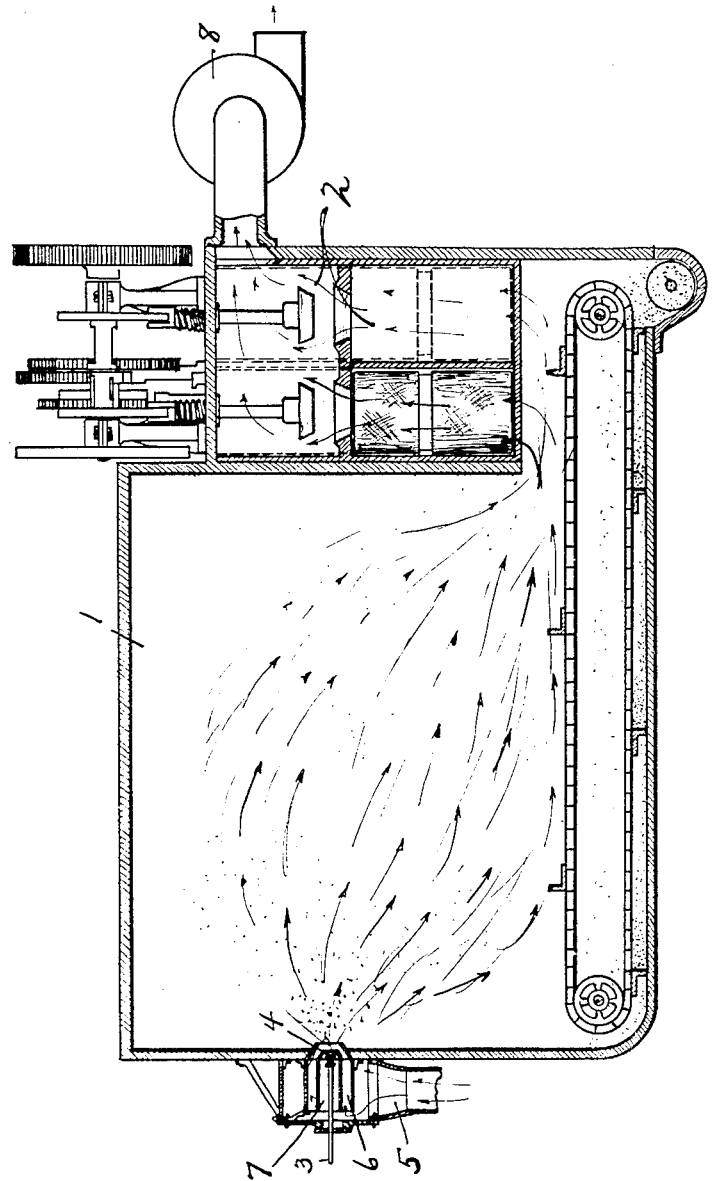
INVENTOR
Irving S. Merrell
BY
Kenison Thompson
ATTORNEYS

UNITED STATES PATENT OFFICE.

IRVING S. MERRELL, OF SYRACUSE, NEW YORK, ASSIGNOR TO MERRELL-SOULE COMPANY, OF SYRACUSE, NEW YORK, A CORPORATION OF NEW YORK.

PROCESS OF TREATING JUICE AND PRODUCT.

1,398,081.  Specification of Letters Patent.  Patented Nov. 22, 1921.

Application filed September 11, 1919. Serial No. 323,208.

*To all whom it may concern:*

Be it known that I, IRVING S. MERRELL, of Syracuse, in the county of Onondaga, in the State of New York, have invented new and useful Improvements in Processes of Treating Juice and Product, of which the following, taken in connection with the accompanying drawings, is a full, clear, and exact description.

This invention relates to certain improvements in process for drying juices and the product resulting therefrom.

Experiment has demonstrated the fact that it is practically impossible to dry or desiccate fruit juice by atomizing the same into a current of heated air. The product resulting from such treatment is of a gummy nature quite different from a dry powdered product.

I have, however, discovered that juices, such as the juice of the citrus fruits, pineapples, grapes, logan berries, raspberries, strawberries, etc., may be reduced to a substantially dry powder consisting of spherical particles which upon reconstitution with water produce a liquid solution of pleasing taste substantially like the original juice. This result may be effected by first combining the juice with a drying promoter comprising or consisting of gelatinized starch and then atomizing the solution into a current of heated air as described in Stauf Patent No. 666,711 and in Bevenot and De Neveu Patent, 1,020,632 for the desiccation of milk. This process and product I claim as my invention.

The juice of the fruit as oranges or lemons, etc., may be obtained in any suitable way as by compressing or squeezing the fruit and the juice is then thoroughly mixed with a suitable quantity of gelatinized starch. The solution so produced is atomized as by forcing the same under pressure through a suitable spray nozzle as that shown in my Patent, No. 1,183,393. The solution so atomized is introduced in finely divided form into a current of heated or moisture absorbing air. The liquid constituents are instantaneously and practically completely vaporized and the solids are collected in substantially dry powdered form. Particles of the powder are very small and of spherical shape and by that definition I include spheres and fragments of spheres.

In practice I have found that ten pounds of gelatinized starch and one hundred pounds of juice thoroughly mixed form a suitable solution for my purpose. Upon reconstitution of the powder by the addition of water, the resultant liquid solution has a somewhat starchy taste, not materially injurious for many purposes. In the accompanying drawings I have diagrammed an apparatus suitable for carrying out my process, the figure illustrating a vertical section of such an apparatus.

The juice to be dried is first mixed with a suitable quantity of gelatinized starch and is then forced under pressure through pipe —3— and nozzle —4— by means of which the solution is divided into infinitely small particles and is injected into the desiccating chamber —1— in the form of a fine spray or mist. The spray so introduced is subjected to the vaporizing action of a current of heated or moisture absorbing air and as shown this air may, perhaps, preferably envelop and surround the spray. The current of air preferably heated in any suitable manner is introduced under pressure through a wind trunk —5— communicating with concentric chambers —6— and —7— through which the air escapes into the desiccating chamber —1— in a manner preferably to surround and envelop the spray. The liquid constituents of the solution are practically instantaneously vaporized and a portion of the powder gravitates to the bottom of the desiccating chamber, the remaining portions passing with the air and vapor into any suitable dust collector, as the apparatus —2— by means of which the remaining portions of the powder are separated from the air and vapor and the air and vapor escape from the collector or may be drawn therefrom by a suitable fan or pump —8—. The resultant product is a substantially dry fine powder consisting of spherical particles, either complete spheres or fragments thereof.

By gelatinized starch as used in the specification and claims hereof, I mean a starch which has been cooked or subjected to heat in the presence of water until a quantity of water has been absorbed by the starch to constitute the product commonly known as gelatinized or cooked starch.

The apparatus shown is merely illustrative of one adapted for my purpose and it will be understood that I have described a specific method of desiccation of the solution of fruit juice and gelatinized starch as illustrative of a perhaps preferred method of carrying out this step of the process in the production of a substantially dry powder comprising spherical particles and that various changes and modifications may be made in the process and many different apparatuses substituted for that disclosed without departing from my invention as set forth in the appended claims.

What I claim is:—

1. A substantially dry powdered product in the form of spherical particles and comprising fruit material combined with gelatinized starch.

2. A substantially dry powdered product in the form of spherical particles comprising the solids of fruit juice combined with a drying promoter including gelatinized starch.

3. The process of drying fruit juice comprising combining fruit juice with gelatinized starch, atomizing the solution so formed into a current of moisture absorbing air and separating the resultant substantially dry product from the air and vapor.

4. The process of drying fruit juice comprising combining the juice with a drying promoter including gelatinized starch, spraying the solution so formed into a current of moisture absorbing air and separating the resultant substantially dry product from the air and vapor.

5. As a new article of manufacture, a substantially dry substance comprising the solids of the juice of a fruit combined with a drying promoter comprising gelatinized starch.

6. A substantially dry powdered product comprising fruit material combined with a drying promoter including gelatinized starch.

In witness whereof I have hereunto set my hand this 29th day of August, 1919.

IRVING S. MERRELL.

Witnesses:
N. ROOT,
HOWARD P. DENISON.